(12) United States Patent
Dorum

(10) Patent No.: US 11,409,292 B2
(45) Date of Patent: Aug. 9, 2022

(54) METHOD, APPARATUS, AND COMPUTER PROGRAM PRODUCT FOR GENERATING A MAP OF ROAD LINKS OF A PARKING LOT

(71) Applicant: HERE Global, B.V., Eindhoven (NL)

(72) Inventor: Ole Henry Dorum, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 182 days.

(21) Appl. No.: 16/827,975

(22) Filed: Mar. 24, 2020

(65) Prior Publication Data
US 2021/0302968 A1   Sep. 30, 2021

(51) Int. Cl.
*G05D 1/02* (2020.01)
*G01C 21/32* (2006.01)
*G01C 21/00* (2006.01)
*B60W 60/00* (2020.01)
*G08G 1/14* (2006.01)

(52) U.S. Cl.
CPC .......... *G05D 1/0212* (2013.01); *G01C 21/32* (2013.01); *G01C 21/3841* (2020.08); *G05D 1/0274* (2013.01); *B60W 60/001* (2020.02); *G05D 2201/0213* (2013.01); *G08G 1/145* (2013.01)

(58) Field of Classification Search
CPC .............. G05D 1/0212; G05D 1/0274; G05D 2201/0213; G01C 21/32; G01C 21/3841; B60W 60/001; G08G 1/145
See application file for complete search history.

(56) References Cited

U.S. PATENT DOCUMENTS

| 6,385,539 | B1 * | 5/2002 | Wilson | G01C 21/30 701/468 |
| 7,797,104 | B2 | 9/2010 | Finn et al. | |
| 9,273,976 | B2 * | 3/2016 | Davidson | G01C 21/32 |
| 9,672,759 | B2 * | 6/2017 | Hofmann | G01C 21/34 |

(Continued)

FOREIGN PATENT DOCUMENTS

| CN | 108 053 679 A | 5/2018 |
| EP | 3 104 120 A1 | 12/2016 |

OTHER PUBLICATIONS

"Deriving Double-Digitized Road Network Geometry from Probe Data", Dorum, Nov. 7, 2017, SIGSPATIAL '17, 10 pages (Year: 2017).*

(Continued)

*Primary Examiner* — Dale W Hilgendorf
(74) *Attorney, Agent, or Firm* — Alston & Bird LLP

(57) ABSTRACT

A method is provided for gathering probe data and using the gathered data to creating parking lot road link geometry. Methods may include: receiving probe data from a plurality of probes in and around a parking lot; identify a plurality of seed points, where the plurality of seed points are iteratively created from the probe data; generating one or more parking lot road links based on identification of compatible seed points; determining if one or more parking lot road links is within a predefined distance of an end of each of the one or more parking lot road links; forming a T-junction between a first parking lot road link and a second parking lot road link; generating a parking lot map including the one or more parking lot road links; and providing for guidance of a vehicle through the parking lot based on the generated parking lot map.

23 Claims, 12 Drawing Sheets

(56) References Cited

U.S. PATENT DOCUMENTS

| | | | |
|---|---|---|---|
| 9,857,191 B2 | 1/2018 | Mason et al. | |
| 9,978,161 B2 | 5/2018 | Dorum | |
| 10,001,378 B2 | 6/2018 | Mund | |
| 10,096,248 B2 | 10/2018 | Penna et al. | |
| 10,352,718 B2 | 7/2019 | Wu et al. | |
| 10,444,020 B2 | 10/2019 | Dorum | |
| 10,546,400 B2 | 1/2020 | Dorum | |
| 2009/0306881 A1* | 12/2009 | Dolgov | G06K 9/6297 701/28 |
| 2012/0116678 A1* | 5/2012 | Witmer | G06F 16/29 702/5 |
| 2013/0144525 A1 | 6/2013 | Yang | |
| 2013/0211699 A1 | 8/2013 | Scharmann et al. | |
| 2016/0356606 A1* | 12/2016 | Dorum | G01C 21/32 |
| 2016/0358349 A1* | 12/2016 | Dorum | G01C 21/32 |
| 2016/0364985 A1* | 12/2016 | Penna | G01C 21/32 |
| 2017/0294036 A1* | 10/2017 | Dorum | G06T 11/203 |
| 2018/0024564 A1* | 1/2018 | Matsuda | G05D 1/0274 701/25 |
| 2018/0087922 A1 | 3/2018 | Wu et al. | |
| 2018/0189578 A1* | 7/2018 | Yang | G06K 9/00798 |
| 2018/0364063 A1* | 12/2018 | Dorum | G01C 21/32 |
| 2020/0012284 A1* | 1/2020 | Morita et al. | G05D 1/0274 |
| 2020/0239024 A1 | 7/2020 | Srinivasan et al. | |
| 2021/0009111 A1 | 1/2021 | Kang | |

OTHER PUBLICATIONS

Agamennoni, G. et al., *Robust Inference of Principal Road Paths for Intelligent Transportation Systems*, IEEE Transactions on Intelligent Transportation Systems, vol. 12, No. 1 (Mar. 2011) 298-308.

Agamennoni, G.et al., *Technical Report: Inference of Principal Road Paths Using GPS Data*, The University of Sydney, Australian Center for Field Robotics: Sydney, Australia, 2010(Jun. 4, 2010) 1-23.

Biagioni, J. et al., *Inferring Road Maps From Global Positioning System Traces: Survey and Comparative Evaluation*, Department of Computer Science, University of Illinois at Chicago (Nov. 2011) 21 pages.

Deng, M. et al., *Generating Urban Road Intersection Models From Low-Frequency GPS Trajectory Data*, International Journal of Geographical Information Science, vol. 32, No. 12 (2018) 2337-2361.

Zheng, L. et al., *A High-Definition Road-Network Model for Self-Driving Vehicles*, International Journal of Geo-Information, 7, 417 (2018) 14 pages.

U.S. Appl. No. 16/827,886, filed Mar. 24, 2020, In re: Dorum, entitled: *Method, Apparatus, and Computer Program Product for Generating Turn Paths Through an Intersection*.

U.S. Appl. No. 16/827,945, filed Mar. 24, 2020, In re: Dorum et al., entitled *Method, Apparatus, and Computer Program Product for Generating Turn Paths Through an Intersection*.

U.S. Appl. No. 16/827,968, filed Mar. 24, 2020, In re: Dorum, entitled *Method, Apparatus and Computer Program Product for Generating Parking Lot Geometry*.

Extended European Search Report for European Application No. 21164222.8 dated Jul. 29, 2021, 9 pages.

Extended European Search Report for European Application No. 21163913.3 dated Aug. 27, 2021, 8 pages.

Gao et al., "VeMap: Indoor Road Map Construction via Smartphone-based Vehicle Tracking", 2016 IEEE Global Communications Conference (GLOBECOM), (Dec. 4-8, 2016), 6 pages.

Non-Final Office Action for U.S. Appl. No. 16/827,968 dated Dec. 21, 2021.

* cited by examiner

METHOD, APPARATUS, AND COMPUTER PROGRAM PRODUCT FOR GENERATING A MAP OF ROAD LINKS OF A PARKING LOT

TECHNOLOGICAL FIELD

An example embodiment of the present disclosure relates to creating a map of road links of a parking lot, and more particularly, to automatically create two- or three-dimensional road links and intersections of a parking lot using vehicle probe data.

BACKGROUND

Maps have been used for centuries for providing route geometry and geographical information. Conventional paper maps including static images of roadways and geographic features from a snapshot in history have given way to digital maps presented on computers and mobile devices. These digital maps can be updated and revised such that users have the most-current maps available to them each time they view a map hosted by a mapping service server. Digital maps can further be enhanced with dynamic information, such as traffic information in real time along roads and through intersections.

Autonomous and semi-autonomous vehicle control requires detailed information relating to roads along which vehicles will travel. Straight sections of road are considerably less complex than intersections of roads where numerous paths are available. Autonomous and semi-autonomous vehicle control requires awareness of all available paths to successfully and efficiently navigate through a region.

BRIEF SUMMARY

A method, apparatus, and computer program product are provided in accordance with an example embodiment for creating a map of road links of a parking lot, and more particularly, to automatically create two- or three-dimensional road links and intersections of a parking lot using vehicle probe data. Embodiments provided herein include an apparatus having at least one processor and at least one memory including computer program code, the at least one memory and computer program code configured to, with the processor, cause the apparatus to: receive probe data from a plurality of probes in and around a parking lot; identify a plurality of seed points, where the plurality of seed points are iteratively created from the probe data; generate one or more parking lot road links based on identification of compatible seed points; determine if one or more parking lot road links is within a predefined distance of an end of each of the one or more parking lot road links; form a T-junction between a first parking lot road link of the one or more parking lot road links and a second parking lot road link of the one or more parking lot road links in response to the second parking lot road link being within the predefined distance of an end of the first parking lot road link; generate a parking lot map including the one or more parking lot road links; and provide for guidance of a vehicle through the parking lot based on the generated parking lot map.

According to an example embodiment, compatible seed points include a seed point heading matching, within a predefined heading angle, a heading of the principal component of a new point candidate vertex for the principal curve of the respective parking lot road link and the seed point heading matching, within a predefined angle, a heading angle of a displacement vector of the new candidate vertex point. Causing the apparatus to generate one or more parking lot road links based on the identification of compatible seed points may include causing the apparatus to: generate one or more principal curves using principal curve formation to identify the compatible seed points, where the generated one or more principal curves are identified as parking lot road links. Causing the apparatus to generate one or more principal curves using principal curve formation to identify the compatible seed points may include causing the apparatus to: apply the principal curve formation to a subset of the seed points until no remaining compatible seed points are found or the principal curve snaps to a vertex of an identified parking lot road links; and identify a principal curve of the subset of the seed points as a parking lot road link.

According to some embodiments, causing the apparatus to identify a plurality of seed points may include causing the apparatus to: segment the parking lot into a plurality of grid cells, where each of the plurality of grid cells includes at least one probe data point; compute a stable weighted center of mass for probe data in each of the plurality of grid cells; and iteratively apply a mean shift to the stable weighted centers of mass for the plurality of grid cells until a location change of a respective stable weighted center of mass is less than a predetermined distance to obtain seed points for the plurality of grid cells. The stable weighted center of mass for a cell may be constrained to move perpendicularly to a principal heading direction of the respective cell. Causing the apparatus to identify the one or more parking lot road links using the seed points may include causing the apparatus to: identify principal components of the shifted stable weighted centers of mass for the plurality of grid cells; establish an orientation of the principal components of the shifted stable weighted centers of mass for the plurality of grid cells; and identify the one or more parking lot road links based, at least in part, on the orientation of the principal components of the shifted stable weighted centers of mass for the plurality of grid cells.

Causing the apparatus of some embodiments to identify the one or more parking lot road links using the seed points may include causing the apparatus to: establish a heading density of probe data within a predefined radius around the shifted stable weighted centers of mass for the plurality of grid cells; and identify the one or more parking lot road links based, at least in part, on the orientation of the principal components of the shifted stable weighted centers of mass for the plurality of grid cells and on the heading density of the shifted stable weighted centers of mass for the plurality of grid cells. The apparatus of some embodiments may be caused to: identify one or more parking lot accessor based on map data; generate an artificial seed point for the one or more parking lot accessors; and where causing the apparatus to generate one or more parking lot road links based on identification of compatible seed points includes causing the apparatus to generate one or more parking lot road links based on the identification of compatible seed points and one or more artificial seed points. Causing the apparatus to provide for guidance of a vehicle through the parking lot based on the generated parking lot map may include causing the apparatus to provide autonomous vehicle control of the vehicle through the parking lot based on the generated parking lot map.

Embodiments provided herein include a computer program product having at least one non-transitory computer-readable storage medium having computer-executable program code instructions stored therein, the computer-executable program code instructions including program code instructions to: receive probe data from a plurality of probes in and around a parking lot; identify a plurality of seed points, where the plurality of seed points are iteratively created from the probe data; generate one or more parking lot road links based on identification of compatible seed points; determine if one or more parking lot road links is within a predetermined distance of an end of each of the one or more parking lot road links; form a T-junction between a first parking lot road link of the one or more parking lot road links and a second parking lot road link of the one or more parking lot road links in response to the second parking lot road link being within the predefined distance of an end of the first parking lot road link; generate a parking lot map including the one or more parking lot road links; and provide for guidance of a vehicle through the parking lot based on the generated parking lot map.

According to an example embodiment, compatible seed points include a seed point heading matching, within a predefined heading angle, a heading of the principal component of a new point candidate vertex for the principal curve of the respective parking lot road link and the seed point heading matching, within a predefined angle, a heading angle of a displacement vector of the new candidate vertex point. The program code instructions to generate one or more parking lot road links based on the identification of compatible seed points includes program code instructions to generate one or more principal curves using principal curve formation to identify the compatible seed points, where the generated one or more principal curves are identified as parking lot road links. The program code instructions to generate one or more principal curves using principal curve formation to identify the compatible seed points may include program code instructions to: apply the principal curve formation to a subset of the seed points until no remaining compatible seed points are found or the principal curve snaps to a vertex of an identified parking lot road link; and identify a principal curve of the subset of the seed points as a parking lot road link.

According to an example embodiment, the program code instructions to identify a plurality of seed points may include program code instructions to: segment the parking lot into a plurality of grid cells, where each grid cell includes at least one probe data point; compute a stable weighted center of mass for probe data in each of the plurality of grid cells; and iteratively apply a mean shift to the stable weighted centers of mass for the plurality of grid cells until a location change of a respective stable weighted center of mass is less than a predetermined distance to obtain seed points for the plurality of grid cells. The stable weighted center of mass is constrained to move perpendicularly to a principal heading direction of the respective cell. The program code instructions to identify the one or more parking lot road links using the seed points may include program code instructions to: identify principal components of the shifted stable weighted centers of mass for the plurality of grid cells; establish an orientation of the principal components of the shifted stable weighted centers of mass for the plurality of grid cells; and identify the one or more parking lot road links based, at least in part, on the orientation of the principal components of the shifted stable weighted centers of mass for the plurality of grid cells.

The program code instructions to identify the one or more parking lot road links using the seed points may include program code instructions to: establish a heading density of probe data within a predefined radius around the shifted stable weighted centers of mass for the plurality of grid cells; and identify the one or more parking lot road links based, at least in part, on the orientation of the principal components of the shifted stable weighted centers of mass for the plurality of grid cells and on the heading density of the shifted stable weighted centers of mass for the plurality of grid cells. The computer program product of an example embodiment may include program code instructions to: identify one or more parking lot accessors based on map data; generate an artificial seed point for the one or more parking lot accessors; and where the program code instructions to generate one or more parking lot road links based on identification of compatible seed points includes program code instructions to generate one or more parking lot road links based on compatible seed points and one or more artificial seed points. The program code instructions to provide for guidance of a vehicle through the parking lot based on the generated parking lot map may include program code instructions to provide autonomous vehicle control of the vehicle through the parking lot based on the generated parking lot map.

Embodiments provided herein may include a method including: receiving probe data from a plurality of probes in and around a parking lot; identify a plurality of seed points, where the plurality of seed points are iteratively created from the probe data; generating one or more parking lot road links based on identification of compatible seed points; determining if one or more parking lot road links is within a predefined distance of an end of each of the one or more parking lot road links; forming a T-junction between a first parking lot road link of the one or more parking lot road links and a second parking lot road link of the one or more parking lot road links in response to the second parking lot road link being within the predefined distance of an end of the first parking lot road link; generating a parking lot map including the one or more parking lot road links; and providing for guidance of a vehicle through the parking lot based on the generated parking lot map.

According to an example embodiment, compatible seed points include a seed point heading matching, within a predefined heading angle, a heading of a principal component of a new point candidate vertex for the principal curve of the respective parking lot road link and the seed point heading matching, within a predefined angle, a heading angle of a displacement vector of the new candidate vertex point. Generating one or more parking lot road links based on the identification of compatible seed points may include generating one or more principal curves using principal curve formation to identify the compatible seed points, where the generated one or more principal curves are identified as parking lot road links.

Embodiments provided herein may include an apparatus including: means for receiving probe data from a plurality of probes in and around a parking lot; means for identify a plurality of seed points, where the plurality of seed points are iteratively created from the probe data; means for generating one or more parking lot road links based on identification of compatible seed points; means for determining if one or more parking lot road links is within a predefined distance of an end of each of the one or more parking lot road links; means for forming a T-junction between a first parking lot road link of the one or more parking lot road links and a second parking lot road link of the one or more parking lot road links in response to the second parking lot road link being within the predefined distance of an end of the first parking lot road link; means for generating a parking lot map including the one or more parking lot road links; and means for providing for guidance of a vehicle through the parking lot based on the generated parking lot map.

According to an example embodiment, compatible seed points include a seed point heading matching, within a predefined heading angle, a heading of a principal component of a new point candidate vertex for the principal curve of the respective parking lot road link and the seed point heading matching, within a predefined angle, a heading angle of a displacement vector of the new candidate vertex point. The means for generating one or more parking lot road links based on the identification of compatible seed points may include means for generating one or more principal curves using principal curve formation to identify the compatible seed points, where the generated one or more principal curves are identified as parking lot road links.

BRIEF DESCRIPTION OF THE DRAWINGS

Figure 1:
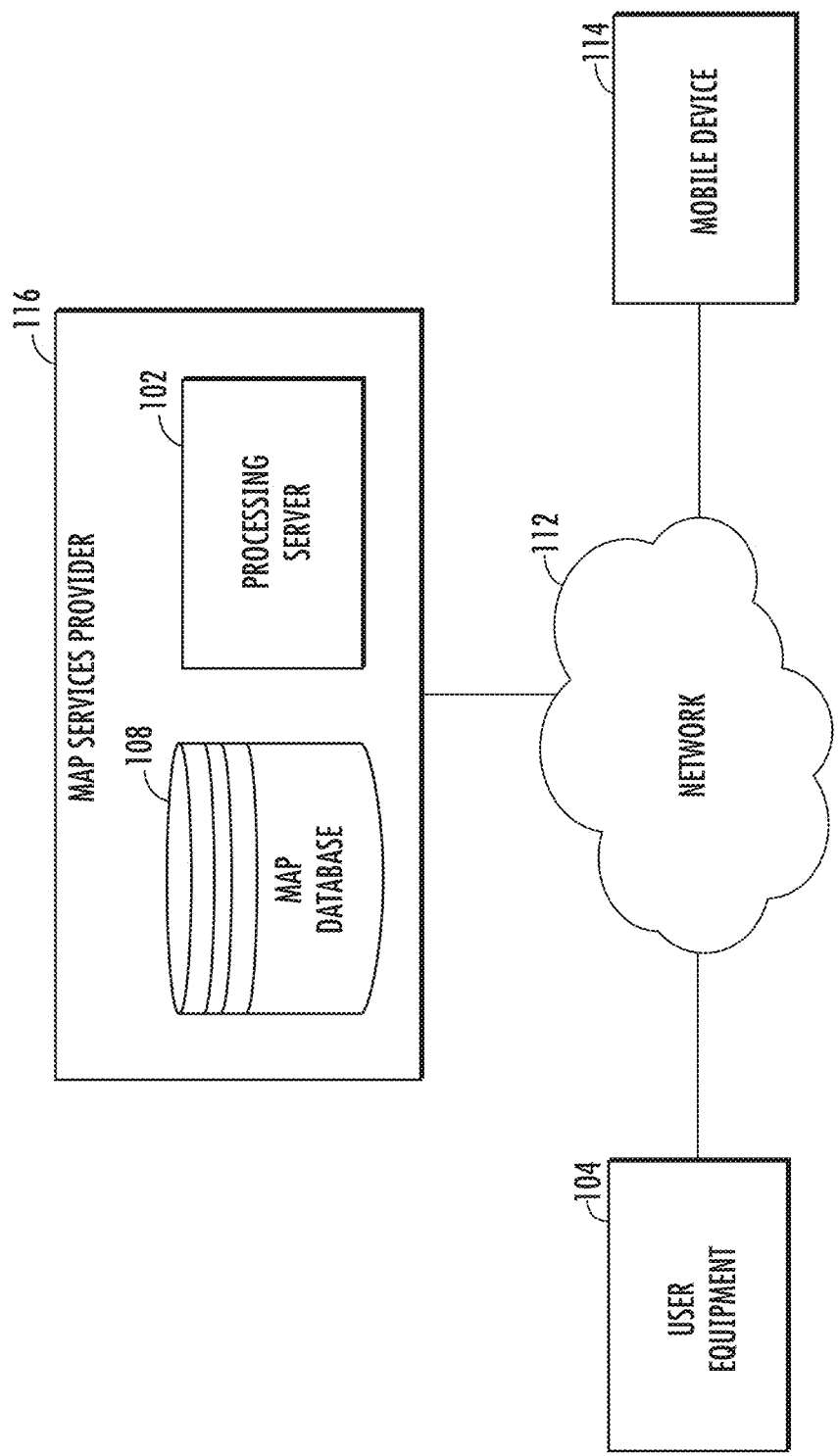
Figure 2:
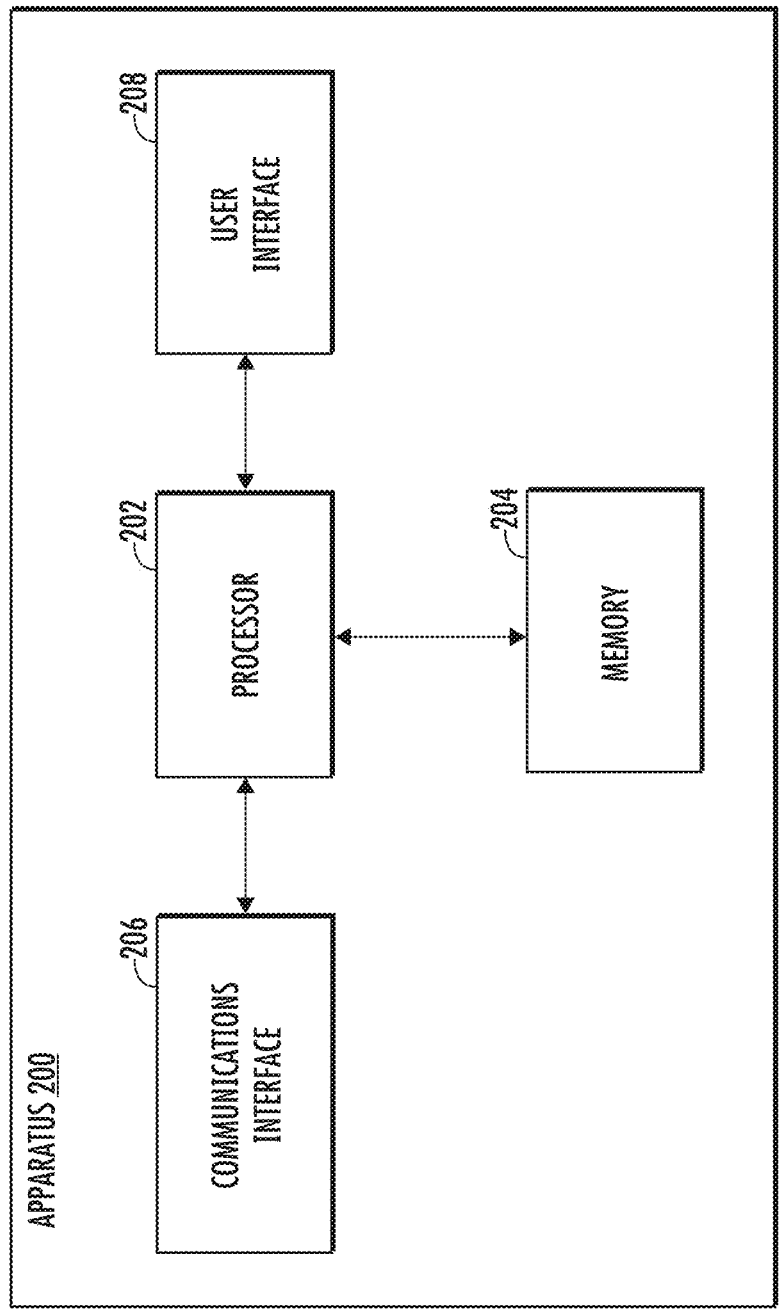
Figure 3:
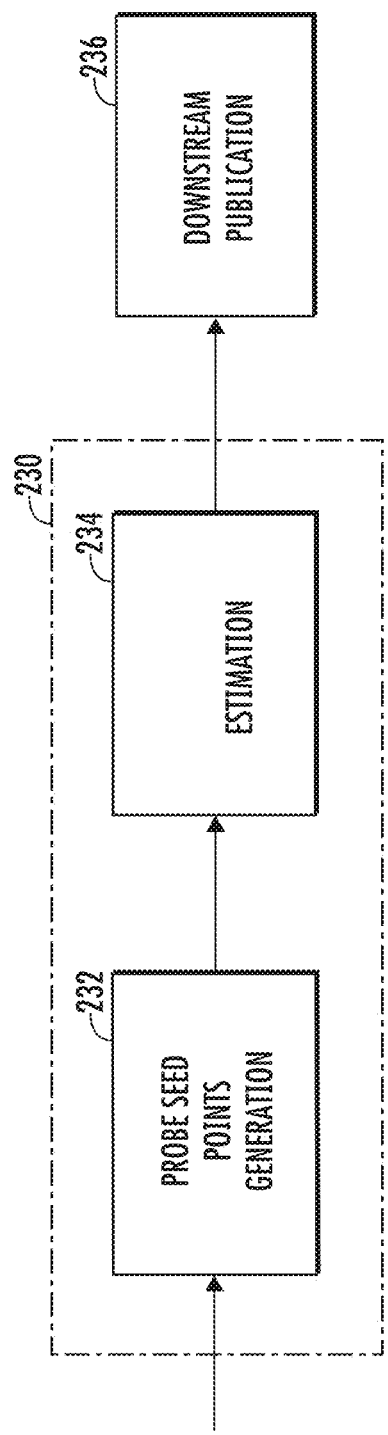
Figure 4:
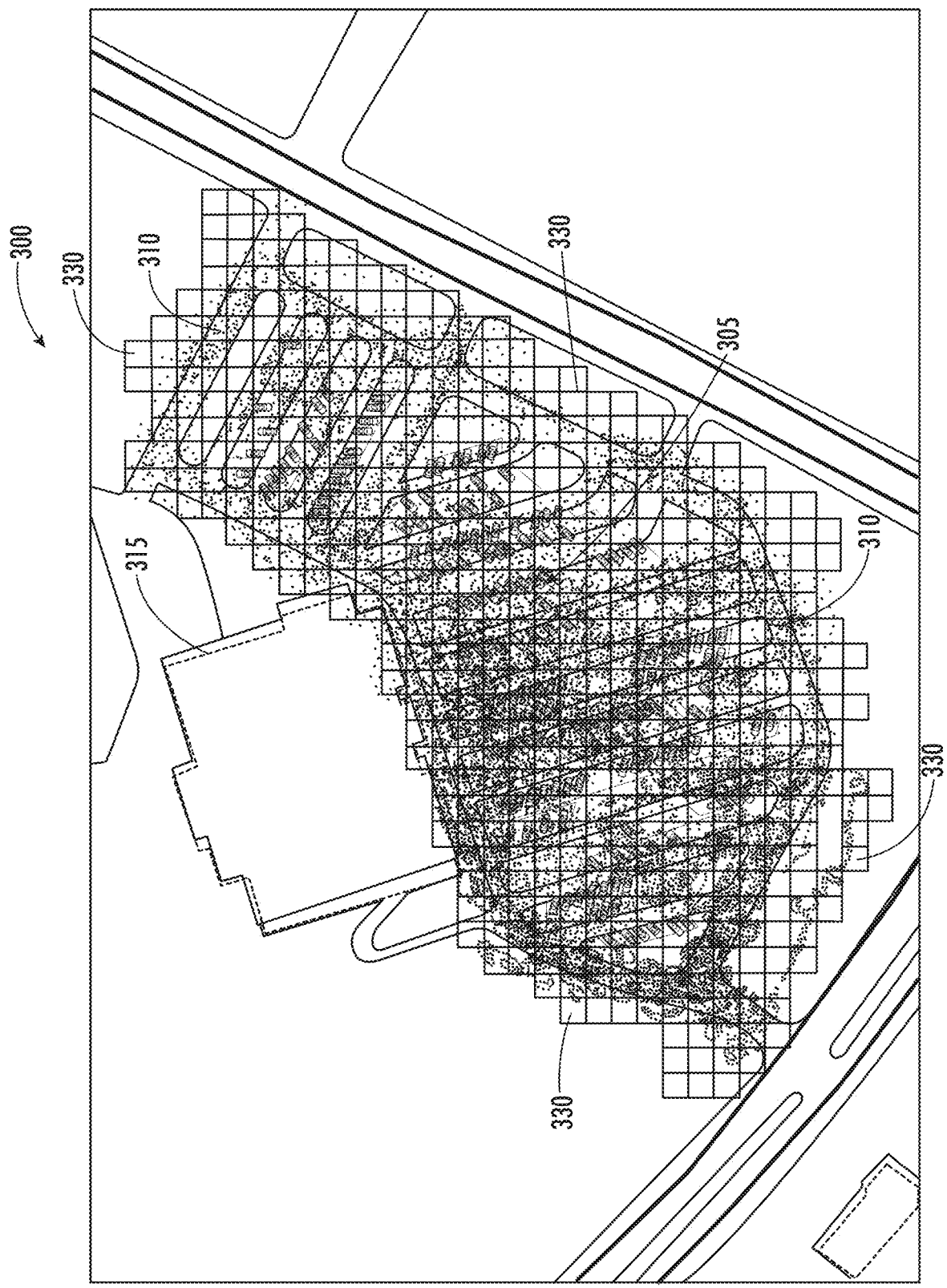
Figure 5:
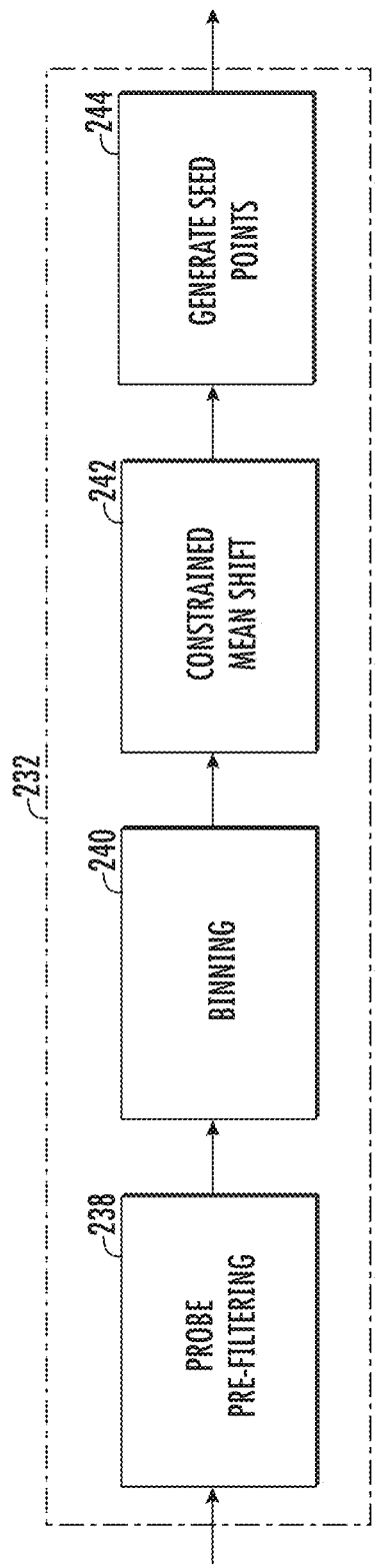
Figure 6:
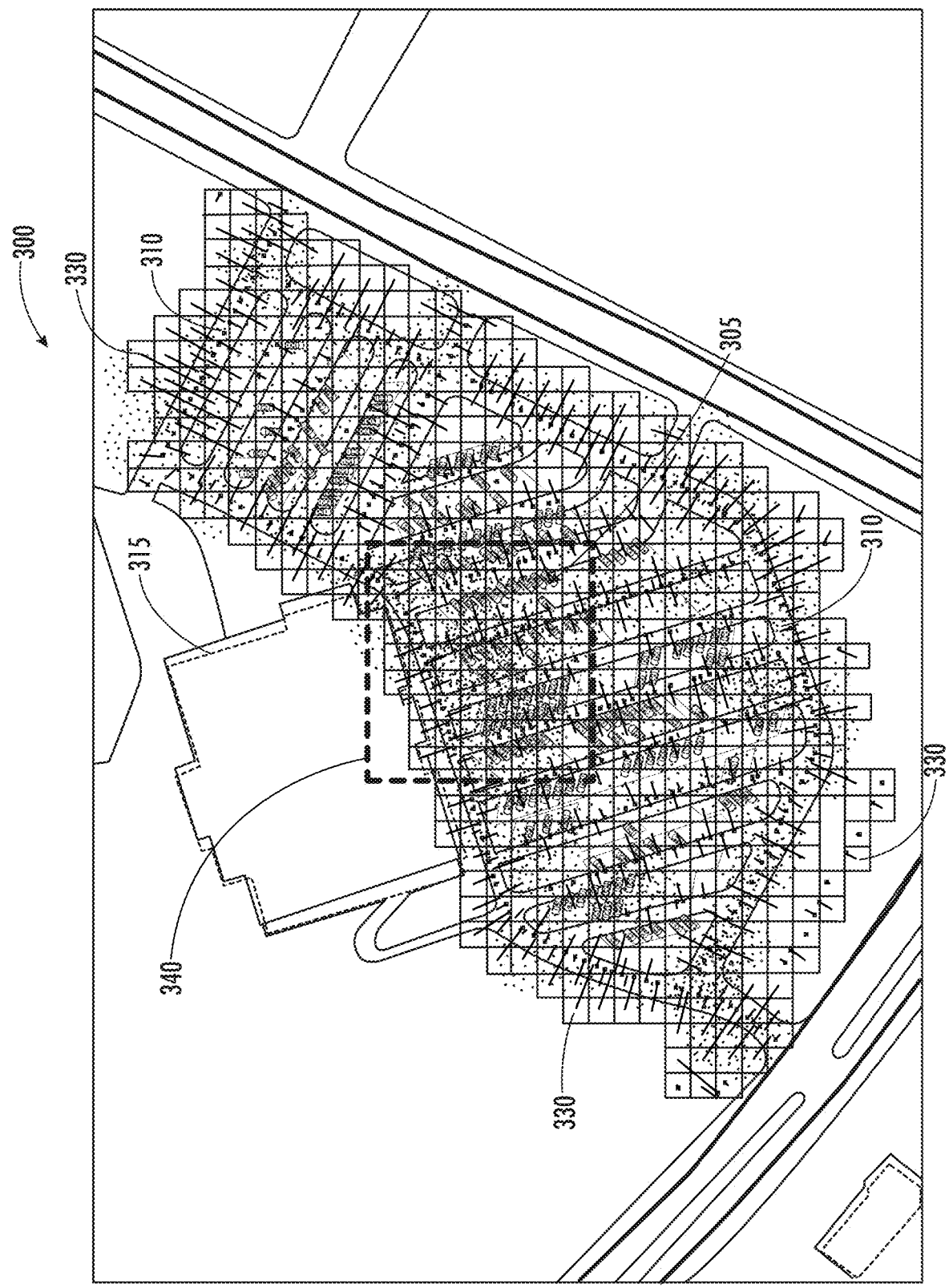
Figure 7:
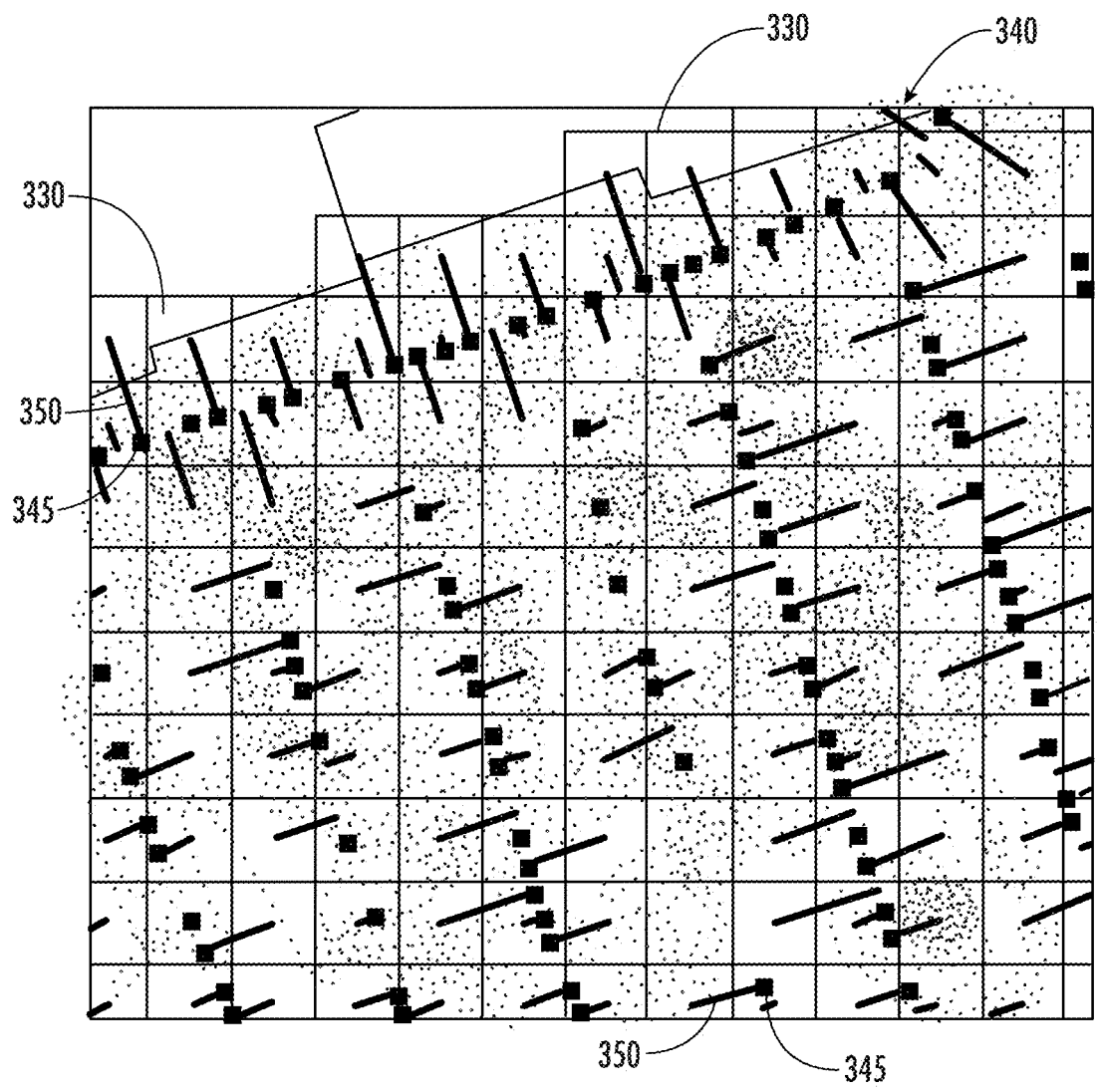
Figure 8:
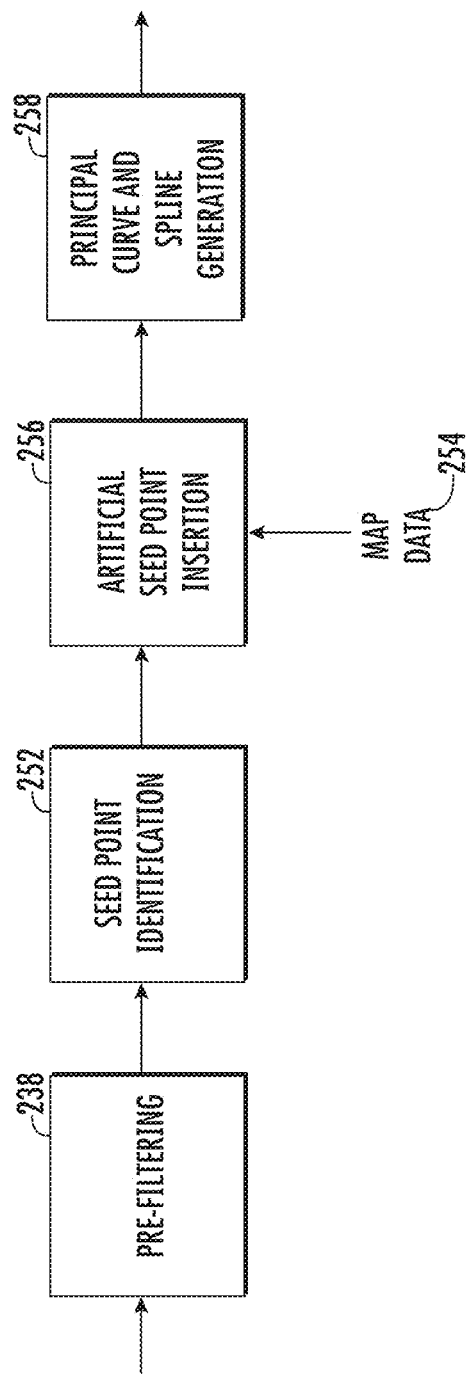
Figure 9:
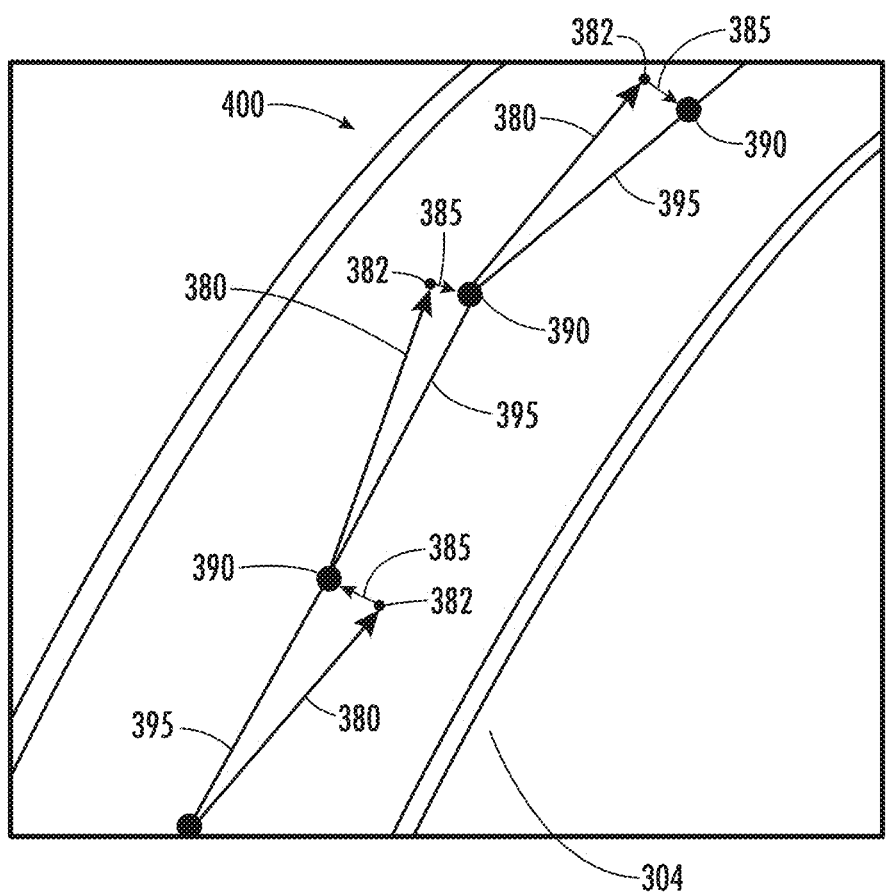
Figure 10:
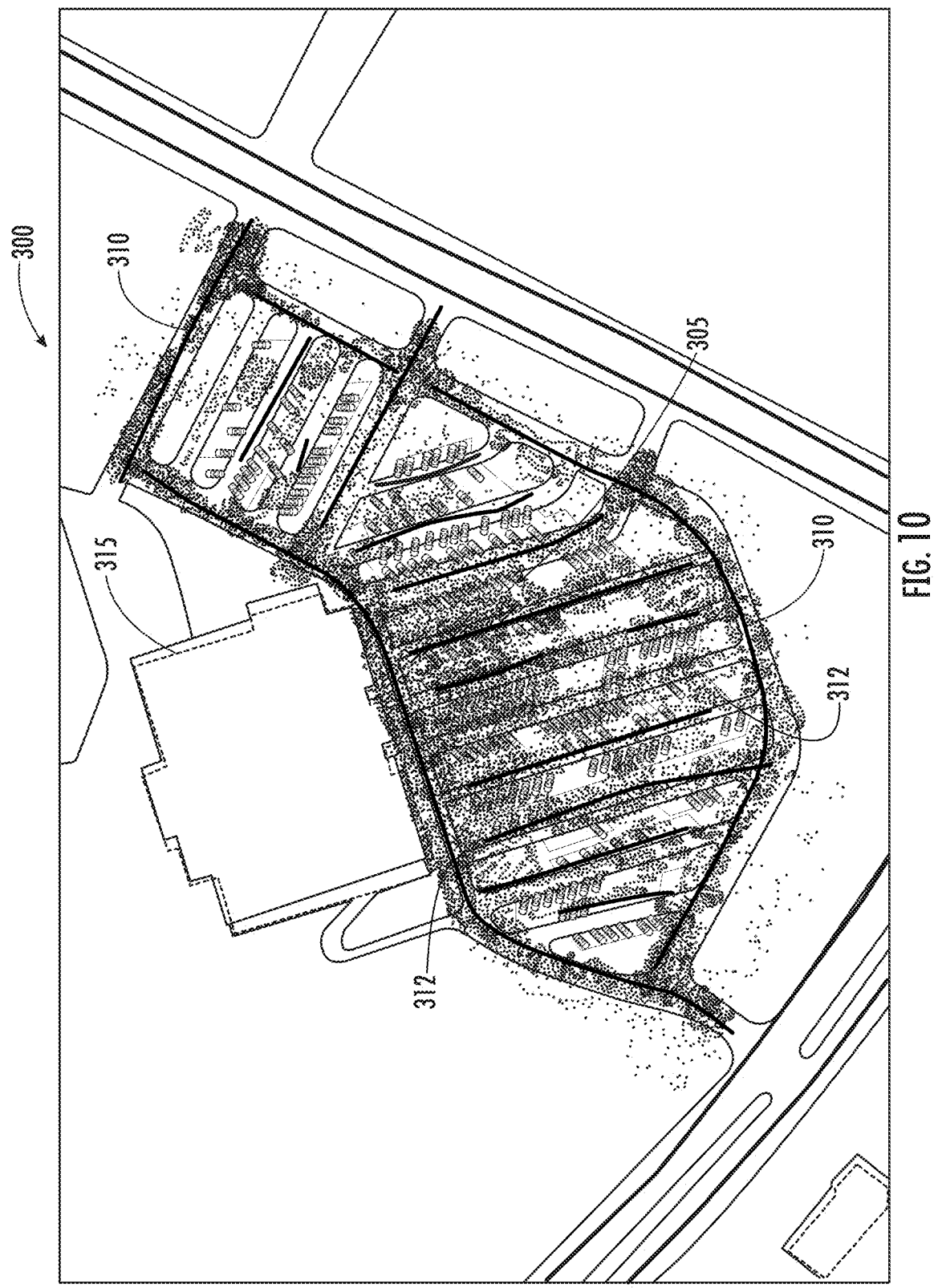
Figure 11:
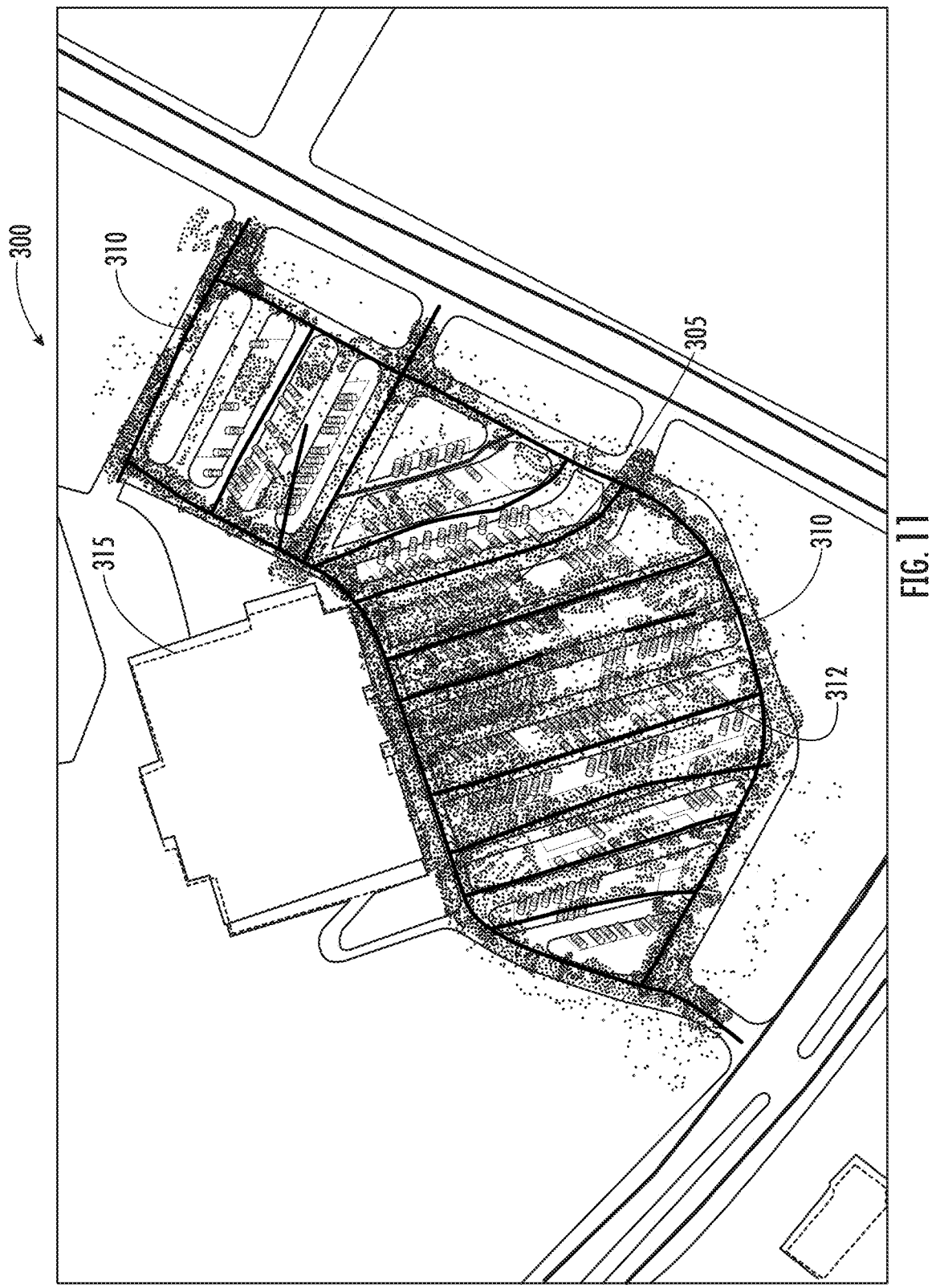
Figure 12:
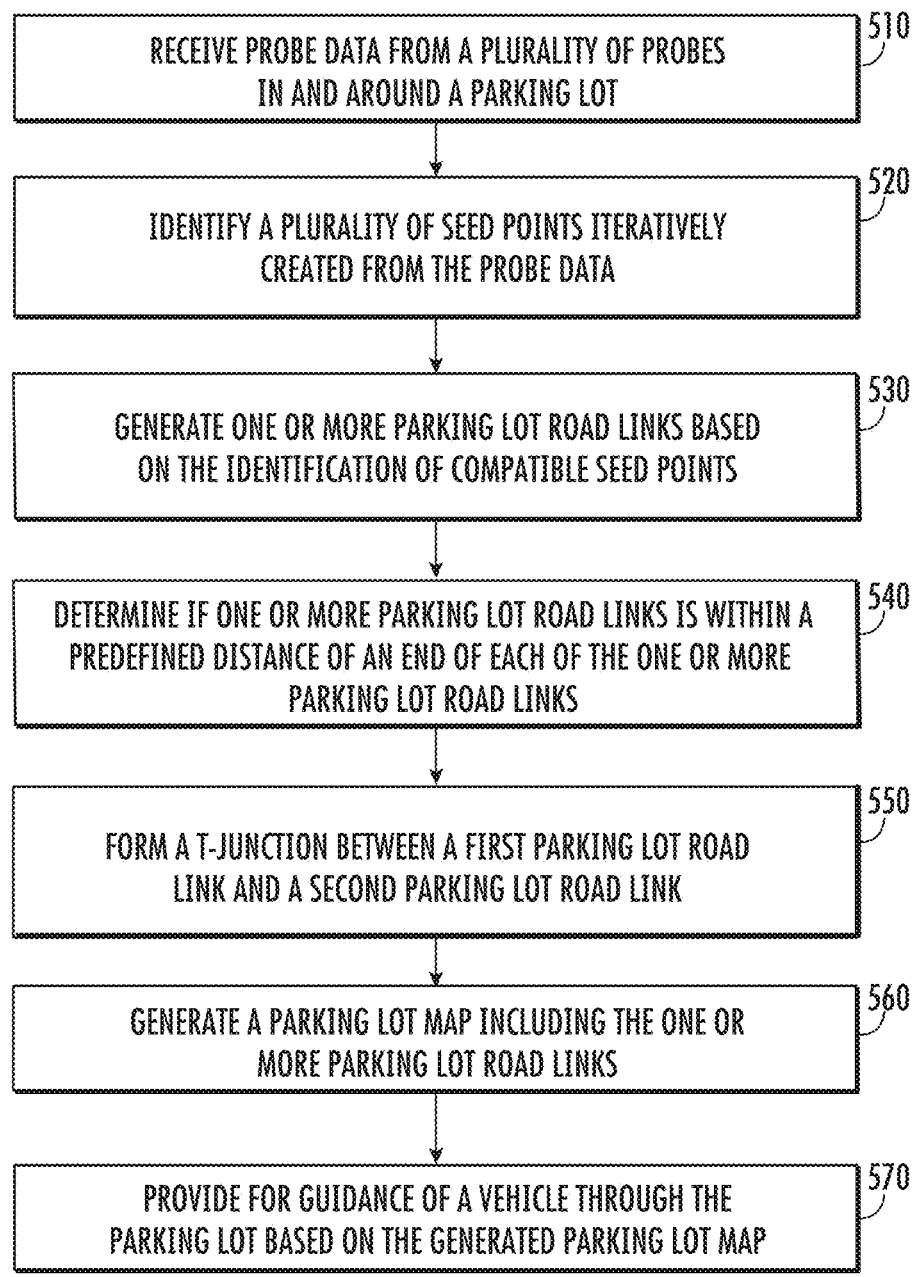

Having thus described example embodiments of the disclosure in general terms, reference will now be made to the accompanying drawings, which are not necessarily drawn to scale, and wherein:

FIG. 1 illustrates a block diagram of a system for creating map intersection turn maneuvers according to an example embodiment of the present disclosure;

FIG. 2 is a block diagram of an apparatus for creating map intersection turn maneuvers according to an example embodiment of the present disclosure;

FIG. 3 is a flow diagram depicting a road link path detection module according to an example embodiment of the present disclosure;

FIG. 4 illustrates a parking lot including probe data according to an example embodiment of the present disclosure;

FIG. 5 is a flow diagram depicting the operations of probe seed point generation submodule of FIG. 3 according to an example embodiment of the present disclosure;

FIG. 6 illustrates the probe data points of FIG. 4 and the constrained Stable Weighted Centers of Mass for each grid cell according to an example embodiment of the present disclosure;

FIG. 7 illustrates a detail view of FIG. 6 according to an example embodiment of the present disclosure;

FIG. 8 is a flow diagram of the operations of the road link path estimation submodule of FIG. 3 according to an example embodiment of the present disclosure;

FIG. 9 illustrates the creation of a principal curve according to an example embodiment of the present disclosure;

FIG. 10 illustrates the parking lot of FIG. 4 with generated principal curves according to an example embodiment of the present disclosure;

FIG. 11 depicts the parking lot of FIG. 10 with the T-junctions formed according to an example embodiment of the present disclosure; and FIG. 12 is a flowchart of a method for forming the geometry of a parking lot according to an example embodiment of the present disclosure.

DETAILED DESCRIPTION

Example embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

As defined herein, a "non-transitory computer readable medium," which refers to a physical medium (e.g., volatile or non-volatile memory device), can be differentiated from a "transitory computer-readable medium," which refers to an electromagnetic signal. In at least one example embodiment, a non-transitory computer readable medium is a tangible non-transitory computer readable medium.

A system, method, apparatus, and computer program product are provided herein in accordance with an example embodiment for creating a map of road links of a parking lot, and more particularly, to automatically create two- or three-dimensional road links and intersections of a parking lot using vehicle probe data. FIG. 1 illustrates a communication diagram of an example embodiment of a system for implementing example embodiments described herein. The illustrated embodiment of FIG. 1 includes a map services provider system 116, a processing server 102 in data communication with a user equipment (UE) 104 and/or a geographic map database, e.g., map database 108 through a network 112, and one or more mobile devices 114. The mobile device 114 may be associated, coupled, or otherwise integrated with a vehicle, such as an advanced driver assistance system (ADAS), for example. Additional, different, or fewer components may be provided. For example, many mobile devices 114 may connect with the network 112. The map services provider 116 may include computer systems and network of a system operator. The processing server 102 may include the map database 108, such as a remote map server. The network may be wired, wireless, or any combination of wired and wireless communication networks, such as cellular, Wi-Fi, internet, local area networks, or the like.

The user equipment 104 may include a mobile computing device such as a laptop computer, tablet computer, mobile phone, smart phone, navigation unit, personal data assistant, watch, camera, or the like. Additionally or alternatively, the user equipment 104 may be a fixed computing device, such as a personal computer, computer workstation, kiosk, office terminal computer or system, or the like. Processing server 102 may be one or more fixed or mobile computing devices. The user equipment 104 may be configured to access the map database 108 via the processing server 102 through, for example, a mapping application, such that the user equipment may provide navigational assistance to a user among other services provided through access to the map services provider 116.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map services provider in association with a services platform. By way of example, the map services provider can collect geographic data to generate and enhance the map database 108. There can be different ways used by the map services provider to collect data. These ways can include obtaining data from other sources, such as municipalities or respective geographic authorities. In addition, the map services provider can employ field personnel to travel by vehicle along roads throughout the geographic region to observe features and/or record information about them, for example. Also, remote sensing, such as aerial or satellite photography, can be used to generate map geometries directly or through machine learning. While the map database 108 may contain road network geometries for road links of a region, some areas where vehicles travel may not be mapped or stored in the map database. For example, parking lots may not be mapped such that vehicle guidance may be available using map database to reach the parking lot, but traveling within the parking lot may be performed without any map data assistance. As such, embodiments described herein may generate parking lot road link geometry from probe data to generate and store such information in the map database 108, thus providing the ability to guide vehicles through the parking lots whether by navigational assistance or through autonomous or semi-autonomous vehicle control.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF)) to organize and/or configure the data for performing navigation-related functions and/or services, such as route calculation, route guidance, map display, speed calculation, distance and travel time functions, and other functions, by a navigation device, such as by user equipment 104, for example. The navigation-related functions can correspond to vehicle navigation, pedestrian navigation, or other types of navigation. The compilation to produce the end user databases can be performed by a party or entity separate from the map services provider. For example, a customer of the map services provider, such as a navigation services provider or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., user equipment 104) to provide navigation and/or map-related functions. For example, the map database 108 may be used with the end user device 104 to provide an end user with navigation features. In such a case, the map database 108 can be downloaded or stored on the end user device (user equipment 104) which can access the map database 108 through a wireless or wired connection, such as via a processing server 102 and/or the network 112, for example.

In certain embodiments, the end user device or user equipment 104 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the user equipment 104 for navigation and map functions such as guidance and map display, for example, and for determination of one or more personalized routes or route segments based on one or more calculated and recorded routes, according to some example embodiments.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Some advanced driver assistance systems may employ digital map data. Such systems may be referred to as map-enhanced ADAS. The digital map data can be used in advanced driver assistance systems to provide information about the road network, road geometry, road conditions, and other information associated with the road and environment around the vehicle. Unlike some sensors, the digital map data is not affected by the environmental conditions such as fog, rain, or snow. Additionally, the digital map data can provide useful information that cannot reliably be provided by sensors, such as curvature, grade, bank, speed limits that are not indicated by signage, lane restrictions, and so on. Further, digital map data can provide a predictive capability well beyond the driver's vision to determine the road ahead of the vehicle, around corners, over hills, or beyond obstructions. Accordingly, the digital map data can be a useful and sometimes necessary addition for some advanced driving assistance systems. In the example embodiment of a fully-autonomous vehicle, the ADAS uses the digital map data to determine a path along the road network to drive, such that accurate representations of the road are necessary, such as accurate representations of intersections and turn maneuvers there through.

The processing server 102 may receive probe data from a mobile device 114. The mobile device 114 may include one or more detectors or sensors as a positioning system built or embedded into or within the interior of the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) is representative of the location of a vehicle at a respective point in time and may be collected while a vehicle is traveling along a route. The probe data may also include speed and direction in some embodiments, such as when probe data is used to facilitate vehicle traffic speed determination. According to the example embodiment described below with the probe data being from motorized vehicles traveling along roadways, the probe data may include, without limitation, location data, (e.g. a latitudinal, longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like.

An example embodiment of a processing server 102 may be embodied in an apparatus as illustrated in FIG. 2. The apparatus, such as that shown in FIG. 2, may be specifically configured in accordance with an example embodiment of the present disclosure for generating or revising map geometry based on a detailed analysis of probe data and existing map geometry. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present disclosure. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present disclosure by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more user equipment 104 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Embodiments provided herein may enable the creation of realistic parking lot map geometries even when the density of indicated positions is sparse and probe data is noisy. Certain embodiments may allow for the repair of defects, such as gaps, incorrect connections, or poor geometry shape in the original road geometry determined from probes. Embodiments may provide a refined representation of a parking lot geometry created automatically. Embodiments may be applicable to the creation of two-dimensional (2D) and three-dimensional (3D) map geometry.

Using probe data alone for the formation of parking lot road links may lead to spurious geometry due to noisy global positioning system (GPS) data, random probe density gradients, and random driving patterns in parking lots, such as driving across parking spaces in a relatively empty parking lot. Embodiments provided herein use seed points to start the formation of principal curves and lines that are robust in placement reliability Embodiments described herein rely on the robust seed points to guide principal curve formation and to ensure that T-junctions are properly terminated without overshoot. As embodiments prevent overshoot at T-junctions, an additional operation may be employed to snap T-junctions together.

Embodiments described herein may use optional parking accessors as inputs, where a parking accessor is a location (e.g., latitude and longitude) location that designates the entry into a parking lot from a road link of a road network, such as that stored in map database 108. If one or more parking accessors are available, those are converted to artificial seed points with the highest priority to ensure formation of parking roads from all parking accessors.

Embodiments described herein may use the probe data to identify a principal curve to which a spline is fitted to the vertices of the curve for establishing a path of a parking lot road link. While the terms "curve" and "principal curve" are used herein in reference to parking lot road links, the road links may include substantially straight road links. However, as road links may vary in shape, embodiments may establish the road links based on a principal curve analysis as described herein, where some resultant road links may be substantially straight, for example. To detect the path of a parking lot road link, a road link path detection module may be implemented. FIG. 3 illustrates an example embodiment of the road link path detection module 230 that includes two submodules: the probe seed point generation module 232 and road link path estimation module 234. The probe seed point generation module 232 generates seed points from probe data associated with a parking lot. The probe data may be associated with a parking lot based, for example, on a parking lot bounding polygon where probe data within the polygon is identified as parking lot probe data. The principal curve of a parking lot road link is derived from the seed points, and a spline fitted to the vertices of the principal curve. The road link path estimation module 234 estimates path of the parking lot road link as detailed further below. The path from the road link path estimation module 234 is provided for downstream analysis, spline fitting, and publication as described further below.

FIG. 4 illustrates a map 300 of a geographic region that includes a parking lot of a building 315 which may be considered a point-of-interest. A road network is created including a plurality of parking lot road links for the parking lot based on probe data 305 generated by probe devices traversing the parking lot.

The seed points generated through probe seed point generation module 232 are generated using a process as illustrated in FIG. 5. As shown, the probe data is pre-filtered at 238 to eliminate low-speed points that are prone to drifting and heading inaccuracy. The remaining probe data is then binned at 240 using a binning procedure that builds a grid over the probe data. The grid cells are sparse, and its configurable width is typically about the size of two road widths. The grid cells are sparse such that there must be at least one probe data point in each grid cell created. The probe data is divided into these grid cells such that independent, parallel processing of each grid cell may be performed and to ensure that every parking lot road link gets seed points to start and guide the principal curve formation.

The map 300 of FIG. 4 depicts the plurality of cells 330 into which the parking lot has been gridded with probe data points 305 within each cell formed. For each grid cell, a constrained Stable Weighted Center of Mass is computed within a radius $R_{SCM}$ of the median probe point of the respective cell 330. The Stable Weighted Center of Mass points will be used as candidate seed points for detecting parking lot road links. At least one seed point per road segment is needed to capture the road link geometry.

Referring back to FIG. 5, the Stable Weighted Center of Mass points are constrained to move perpendicularly to the probe heading and thus the road direction using a constrained mean shift at 242. As noted above, probe data may or may not include heading information; however, heading can be derived for a probe based on a timestamped sequence of probe data point locations. FIG. 6 illustrates this constraint with the Stable Weighted Center of Mass points of each cell 330 perpendicularly constrained via projection line to the probe heading direction. FIG. 7 is a detail view of the segment 340 of the parking lot with the Stable Weighted Centers of Mass identified as the dots 345 within the cells, while the projection line 350 is the perpendicularly constrained movement of the Mean Shift. The probe heading direction for a cell is the principal heading direction of the probe data points within that cell, where the cell's influence on the road link geometry is perpendicular to the principal heading direction of the cell. Therefore, only the perpendicular component of the gradient of the Mean Shift to the median probe heading directions is considered. The seed points of a geometry of the parking lot road links are created by iterating the projections 350 of each cell that are perpendicular relative to the cell principal heading direction established by the probe headings within the cell 330. During each iteration, the principal heading is refined to reflect minor changes in local probe heading during the iteration path. Iteration stops when the seed point is considered stationary, where stationary is considered when movement is below some predetermined distance threshold, such as 0.1 meters.

Without constraining the Mean Shift gradient direction, the stable weighted centers of mass tend to move along the road center to form seed clusters, which is undesirable. Thus, the stable weighted centers of mass are constrained in movement to be perpendicular to the road based on the median probe heading direction for the cell, which imposes an even seed distribution along the turn maneuver rather than creating bunches of disconnected seed points which would not produce a smooth, natural road link geometry.

Mean Shift, as described herein, is a non-parametric feature-space analysis technique for locating the maxima of a density function:

$$x_{(i+1)} = \mu(x_{(i)}) \text{ where}$$

$$\mu(x) = \frac{\sum_{i=0}^{n} K_H(X_i - x)X_i}{\sum_{i=0}^{n} K_H(X_i - x)} \text{ until } x \text{ constant,}$$

In the instant case, $K_H(\cdot)$ is the Gaussian kernel function. The weighting is thus performed using a Gaussian kernel function in the above example; however, other kernels can be used. The center of mass is computed iteratively using the Mean Shift until it converges, where the change in location does not change within some predefined threshold. Note that the Stable Weighted Center of Mass may end up outside the bounds of the grid cell. Stable Weighted Center of Mass is also known as the Stable Weighted Expectation $\widetilde{\mu}^*$ as Mean Shift center of mass $\mu^x$ around x. The center of mass is:

$$\mu(x) = \frac{\sum_{i=0}^{n} K_H(X_i - x)X_i}{\sum_{i=0}^{n} K_H(X_i - x)}$$

Where $K_H(\cdot)$ is the Gaussian kernel function:

$$K_H(\cdot) = e^{-\frac{1}{2}\left(\frac{(X_i - x)}{h}\right)^2}$$

And h is the bandwidth. Other convolution kernels can be used, such as Uniform, Biweight, Epanechnikov, for example. The constrained, Mean Shifted Stable Weighted Centers of Mass are the generated seed points at 244 of FIG. 5.

The road link path estimation module 234 of FIG. 3 may use the seed points for road link geometry generation. However, the seed points may still include outliers that may adversely influence the generation of the road link geometry. While seed points provide a signature of raw probe data with drifting removed as much as possible, outliers may still exist. The issue of the presence and effect of outliers is compounded within complex parking lots due to limitations of map matching such that probe data from other parking lot road links or even from roads surrounding a parking lot may be included. Embodiments described herein use only compatible seed points ahead in principal curve formation such that outlier seed points are generally omitted from consideration for road link formation due to incompatibility. Hence, embodiments may inherently filter seed points to mitigate the interference from these outliers.

Parking lot accessors, which may be identified from map data, such as from map database 108 of map services provider, may be identified as seed points. Specifically, parking lot accessors may be identified as high-priority seed points as they are critical to providing guidance into and out of a parking lot. FIG. 8 illustrates probe data pre-filtering at 238 (as in FIG. 5) whereby probe data points having speeds below a predetermined speed are filtered out and not considered for seed point generation. At 252 seed points are identified using the techniques described above. Artificial seed points are identified at 256 based upon parking accessors identified in map data 254, such that probe data points are not required for the generation of parking accessor seed points. The principal curves are generated at 258 from which splines are generated indicative of parking lot road links.

Before the spline generation occurs, the seed points are used for principal curve generation. The seed points are the Stable Weighted Centers of Mass, such that for the Stable Weighted Center of Mass of the grid cell, the largest Principal Component $\gamma^x$ is computed for radius $R_{PCM}$ centered at its Stable Weighted Center of Mass $\widetilde{\mu}^*$ using the probe heading information, whether provided in the probe data or derived therefrom. The largest Principal Component $\gamma^x$ indicates the orientation of the majority of probe points in that particular neighborhood or cell and thus the local orientation of the turn maneuver. This orientation is used to determine the direction to look for the presence of additional probe points forming the parking lot road principal curve. A technique such as the Principal Component Analysis (PCA), which is a dimensionality reduction technique, may be used to derive the Principal Components.

A Heading Density for the neighborhood of probe data points in radius R around each clustered Stable Weighted Center of Mass may be computed. The Heading Density is a metric indicating the amount of probe points with compatible headings. For example, the headings within a threshold angle $\theta_{thresh}$ with respect to the local road link heading(s) $\gamma^x$.

The Stable Weighted Center of Mass $\mu^x$ seed points are entered in a processing list and sorted by Heading Density, with the highest density first. This enables processing of the highest density seed points first which are the best candidates for creating the principal curve for the parking lot roads as they have the most similar probe headings reflecting a true road direction. If the probe data for the parking lot road link is sparse, the initial seed point may not create the full parking lot road link. Other seed points may then continue the parking lot road link geometry and snap to the existing curve completing the geometry for the parking lot road link.

In both directions ($\gamma^x$, $-\gamma^x$) along the Principal Component for the remaining Stable Weighted Center of Mass seed point with the highest weight, starting at $x_0 = \mu^x$, a polyline is created that follows the center of the probe points with consistent headings in both directions until any of the following stopping criteria is reached: No more heading compatible probe points are found; or the polyline is snapped to a vertex of a previous curve section of the road link. To snap to the vertex of a pervious curve section, a new value of x is found by following the first principal component $\gamma^x$ at $x_{i+1}$:

$$x_{i+1} = x_i + s\gamma^x, \text{ where } s \text{ is some step size.}$$

A principal component analysis is performed to update the principal component $\gamma^x$ using Median Vector locally at x, for probes with compatible headings with respect to $\gamma^x$, ensuring that the direction of $\gamma^x$ is maintained.

A stable weighted expectation is calculated as Mean Shift center of mass $\mu^x$ around $x_{i+1}$ using a Gaussian kernel function but movement is constrained perpendicularly to the principal component of $\gamma^x$. Principal curves are created by moving a step in the principal heading direction followed by a heading refinement and Mean Shift iteration back to the parking lot road link center to create the next vertex. FIG. 9 illustrates an example of the creation of the principal curve along segments 395 with the principal heading direction shown by the arrows 380 along road 400. The heading refinement and Mean Shift iteration is shown by arrows 385, bringing the Stable Weighted Centers of Mass 382 defining the curve back to the principal curve path defined by segments 395 center to create the next vertex 390.

One or more principal curves are created through principal curve formation using the seed points by extending the principal curve from a first point to a second point by a predefined distance in the orientation of the principal component of the first point. Referring again to FIG. 9, the predefined distance in the orientation of the principal component of a seed point 390 is represented as 380. A constrained Stable Weighted Center of Mass for the second point 382 is computed with an iterated Mean Shift 385 perpendicular to the principal component 380. This is repeated along the extension of the principal curve in the orientation of the principal component of the next point, where the principal curves are identified as parking lot road links.

Embodiments may search for pre-existing heading compatible vertex points v near edge $x_i$, $\mu^x$ to snap to, if any. If a vertex point v is found along edge $x_i$, $\mu^x$, the Stable Weighted Center of Mass $\mu^x$ is replaced with found vertex v and added to polyline as vertex $x_{i+1} = v$. All seed points within a distance R along an updated edge $x_i$, $x_{i+1} = v$ with heading that is within some heading threshold to the edge $x_i$, $x_{i+1}$ are removed from the seed point processing list. The polyline has thus converged in this direction.

If a vertex point v was found along edge $x_i$, $\mu^x$, the found vertex v is replaced with $\mu^x$ and it is added to polyline as vertex $x_{i+1} = v$. All seed points within radius R along updated edge $x_i$, $x_{i+1} = v$ are removed from the seed point processing list. The polyline has thus converged in this direction.

If a vertex point was not found near edge $x_i$, $\mu^x$, a compatible seed point ahead in the vicinity of the vertex is sought. A compatible seed point ahead is identified when the seed point heading matches (within a predefined threshold) that of the principal component $\gamma^x$ of the new candidate vertex point and the seed point heading matches (within a predefined threshold) the direction vector of the displacement vector of the new candidate vertex point. Center of mass $\mu^x$ is added to polyline as vertex $x_{i+1} = \mu^x$ and all seed points along edge $x_i$, $x_{i+1} = \mu^x$ within distance R with a heading that is within a heading threshold to the edge are removed from the seed point processing list.

If the Mean Shift has no probe points with consistent heading (within a predefined threshold), then the polyline has converged in this direction. The process above is repeated for identifying a vertex point near an edge in the opposite direction of the principal component, namely $-\gamma^x$. When growing the polyline in the direction opposite the principal component, adding vertices to the polyline occurs at the other end of the polyline, and $\gamma^x$ in the process above is replaced using $-\gamma^x$.

Within a parking lot, T-intersections or T-junctions are common, particularly where parking lot road links end at a road link that traverses numerous parking lot road links. Embodiments described herein identify T-junctions and form accurate representations of the T-junctions for use in guidance of a vehicle, through navigation and/or through autonomous or semi-autonomous vehicle control. To detect the T-junctions, a search is first conducted for pre-existing heading compatible vertex points v near edge $x_i$, $\mu^x$ to snap to, if any are available.

Candidate T-junctions are connected together to form properly connected parking lot road link geometry. After the principal curves have been created, there will be gaps 312 at each T-junction, as illustrated in FIG. 10. These gaps 312 are due to guided principal curve analysis seeking compatible seed points ahead to allow the curve to proceed did not find any compatible seed points ahead for each T-junction thus terminating each principal curve before reaching each T-junction. When no compatible seed points are found ahead in the direction of travel, either the end of the road is reached (e.g., no more compatible probe points to process) or a T-junction has been reached (e.g., there is a crossing road to which the road should be snapped). At the end of each parking lot road segment identified by a principal curve end, a spatial search is performed to determine if there is a polyline edge of an existing principal curve to snap to for forming a T-junction. If no vertex or polyline is found, the end of the parking lot road link has been reached and no further action is needed.

The formation of T-junctions are controlled by two parameters to ensure a valid connection to prevent false snapping across non-road regions. The underlying density of heading compatible probes for the gap to be bridged must match some fraction $\varepsilon$ (0.0, 1.0] of the heading compatible probes of the parking road leading up to the T-junction. The method also supports a minimum auto-snap distance $\delta$ for which roads will be auto-snapped when the distance is smaller than $\delta$, regardless of underlying probe validation density. When enabled, the auto-snap distance $\delta$ should be very small to automatically join roads that are almost touching. To connect the existing principal curve (e.g., the road link ending into another road link) to the other geometry (e.g., the road link into which the first road link ends), the principal curve is extended to compute the intersection with the edge of the crossing road. The fully connected geometry after snapping all potential T-junctions of FIG. 10 is illustrated in FIG. 11.

After all seed points have been processed, and thus all polylines have been created and connected, a road network graph is formed by performing polyline intersection detection. At curve ends and at each polyline intersection, a node is created to indicate the end point for each road link. As nodes are detected, the road network graph relationship is updated accordingly. After the graph of the road network has been created, the probe data is map matched to the parking lot road links of the graph to establish useful properties such as: minimum, maximum, mean, and median speed statistics; probe density (e.g., the number of heading compatible probe points with respect to driving directions); direction of travel (e.g., based on fraction of heading compatible probe data points in each direction along the link); and link trajectory count.

Embodiments of the present disclosure generate a parking lot geometry having accurate parking lot road links and intersections such that the geometry can be used to guide a vehicle through the parking lot. Guidance may entail navigational assistance whereby a user is guided along the parking lot road links. Optionally, guidance may entail autonomous or semi-autonomous control of a vehicle using the parking lot geometry to facilitate the autonomous or semi-autonomous control, such as through use of an ADAS as described above.

FIG. 12 illustrates a flowchart depicting methods according to example embodiments of the present disclosure. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present disclosure and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions that execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems that perform the specified functions, or combinations of special purpose hardware and computer instructions.

FIG. 12 illustrates a flowchart of a method according to an example embodiment of the present disclosure for generating parking road geometry. As shown at 510, probe data is received from a plurality of probes in and around a parking lot. From the probe data, a plurality of seed points are iteratively created as shown at 520. One or more parking lot road links are generated at 530 based on the identification of compatible seed points. It is determined at 540 if one or more parking lot road links is within a predefined distance of an end of each of the one or more parking lot road links. A T-junction is formed at 550 between a first parking lot road link and a second parking lot road link. This may be performed in response to the second parking lot road link being within a predefined distance of an end of the first parking lot road link. At 560, a parking lot map is generated including the one or more parking lot road links. At 570, guidance is provided of a vehicle through the parking lot based on the generated parking lot map. Guidance may be in the form of navigational assistance to a manually driven vehicle, fully autonomous guidance and control of a vehicle through the parking lot such as by an ADAS, or any level of semi-autonomous vehicle control therebetween.

In an example embodiment, an apparatus for performing the methods of FIG. 12 above may include a processor (e.g., the processor 202) configured to perform some or each of the operations (510-570) described above. The processor may, for example, be configured to perform the operations (510-570) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 510-570 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one memory including computer program code, the at least one memory and computer program code configured to, with the processor, cause the apparatus to at least:
   receive probe data from a plurality of probes in and around a parking lot;
   identify a plurality of seed points, wherein the plurality of seed points are iteratively created from the probe data;
   generate one or more parking lot road links based on identification of compatible seed points that possess compatible seed point headings within a predefined heading angle of a new candidate vertex point;

determine a principal curve end of the one or more parking lot road links based on no additional compatible seed points remaining;

perform a spatial search from the principal curve end to determine if one or more candidate parking lot road links is within a predefined distance of the principal curve end of each of the one or more parking lot road links;

form a T-junction between the principal curve end of the one or more parking lot road links and an identified parking lot road link of the one or more candidate parking lot road links in response to the identified parking lot road link being within the predefined distance of the principal curve end;

generate a parking lot map comprising the one or more parking lot road links; and provide for guidance of a vehicle through the parking lot based on the generated parking lot map.

2. The apparatus of claim 1, wherein the compatible seed points comprise a respective seed point heading matching, within a predefined heading angle threshold, a heading of a principal component of the new candidate vertex point for a principal curve of a respective parking lot road link and the respective seed point heading matching, within the predefined heading angle threshold, a heading angle of a displacement vector of the new candidate vertex point.

3. The apparatus of claim 1, wherein causing the apparatus to generate the one or more parking lot road links based on the identification of the compatible seed points comprises causing the apparatus to:

generate one or more principal curves using principal curve formation to identify the compatible seed points, wherein the generated one or more principal curves are identified as the parking lot road links.

4. The apparatus of claim 3, wherein causing the apparatus to generate the one or more principal curves using principal curve formation to identify the compatible seed points comprises causing the apparatus to:

apply the principal curve formation to a subset of the plurality of seed points until no remaining compatible seed points are found or the one or more principal curves snaps to a vertex of an identified parking lot road link; and identify the one or more principal curves of the subset of the seed points as the one or more parking lot road links.

5. The apparatus of claim 1, wherein causing the apparatus to identify the plurality of seed points comprises causing the apparatus to:

segment the parking lot into a plurality of grid cells, wherein each grid cell comprises at least one probe data point;

compute a stable weighted center of mass for probe data in each of the plurality of grid cells; and iteratively apply a mean shift to the stable weighted centers of mass to obtain shifted stable weighted centers of mass for the plurality of grid cells until a location change of a respective stable weighted center of mass is less than a predetermined distance to obtain the plurality of seed points for the plurality of grid cells.

6. The apparatus of claim 5, wherein the stable weighted center of mass for a cell is constrained to move perpendicularly to a principal heading direction of the cell.

7. The apparatus of claim 5, wherein causing the apparatus to generate the one or more parking lot road links based on the identification of the compatible seed points comprises causing the apparatus to:

identify principal components of the shifted stable weighted centers of mass for the plurality of grid cells;

establish an orientation of the principal components of the shifted stable weighted centers of mass for the plurality of grid cells; and identify the one or more parking lot road links based, at least in part, on the orientation of the principal components of the shifted stable weighted centers of mass for the plurality of grid cells.

8. The apparatus of claim 7, wherein causing the apparatus to identify the one or more parking lot road links based on the identification of the compatible seed points further comprises causing the apparatus to:

establish a heading density of the probe data within a predefined radius around the shifted stable weighted centers of mass for the plurality of grid cells; and identify the one or more parking lot road links based, at least in part, on the orientation of the principal components of the shifted stable weighted centers of mass for the plurality of grid cells and on the heading density of the shifted stable weighted centers of mass for the plurality of grid cells.

9. The apparatus of claim 1, wherein the apparatus is further caused to:

identify one or more parking lot accessors based on map data;

generate one or more artificial seed point for the one or more parking lot accessors; and wherein causing the apparatus to generate the one or more parking lot road links based on the identification of the compatible seed points comprises causing the apparatus to generate the one or more parking lot road links based on the identification of compatible seed points and the one or more artificial seed points.

10. The apparatus of claim 1, wherein causing the apparatus to provide for guidance of the vehicle through the parking lot based on the generated parking lot map comprises causing the apparatus to:

provide autonomous vehicle control of the vehicle through the parking lot based on the generated parking lot map.

11. A computer program product comprising at least one non-transitory computer-readable storage medium having computer-executable program code instructions stored therein, the computer-executable program code instructions comprising program code instructions to:

receive probe data from a plurality of probes in and around a parking lot;

identify a plurality of seed points, wherein the plurality of seed points are iteratively created from the probe data;

generate one or more parking lot road links based on identification of compatible seed points that possess compatible seed point headings within a predefined heading angle of a new candidate vertex point;

determine a principal curve end of the one or more parking lot road links based on no additional compatible seed points remaining;

perform a spatial search from the principal curve end to determine if one or more candidate parking lot road links is within a predefined distance of the principal curve end of each of the one or more parking lot road links;

form a T-junction between the principal curve end of the one or more parking lot road links and an identified parking lot road link of the one or more candidate parking lot road links in response to the identified parking lot road link being within the predefined distance of the principal curve end;

generate a parking lot map comprising the one or more parking lot road links; and provide for guidance of a vehicle through the parking lot based on the generated parking lot map.

12. The computer program product of claim 11, wherein the compatible seed points comprise a respective seed point heading matching, within a predefined heading angle threshold, a heading of a principal component of the new candidate vertex point for a principal curve of a respective parking lot road link and the respective seed point heading matching, within the predefined heading angle threshold, a heading angle of a displacement vector of the new candidate vertex point.

13. The computer program product of claim 11, wherein the program code instructions to generate the one or more parking lot road links based on the identification of the compatible seed points comprise program code instructions to:

generate one or more principal curves using principal curve formation to identify the compatible seed points, wherein the generated one or more principal curves are identified as the parking lot road links.

14. The computer program product of claim 13, wherein the program code instructions to generate the one or more principal curves using principal curve formation to identify the compatible seed points comprise program code instructions to:

apply the principal curve formation to a subset of the plurality of seed points until no remaining compatible seed points are found or the one or more principal curves snaps to a vertex of an identified parking lot road link; and identify the one or more principal curves of the subset of the seed points as the one or more parking lot road links.

15. The computer program product of claim 11, wherein the program code instructions to identify the plurality of seed points comprise program code instructions to:

segment the parking lot into a plurality of grid cells, wherein each grid cell comprises at least one probe data point;

compute a stable weighted center of mass for probe data in each of the plurality of grid cells; and iteratively apply a mean shift to the stable weighted centers of mass to obtain shifted stable weighted centers of mass for the plurality of grid cells until a location change of a respective stable weighted center of mass is less than a predetermined distance to obtain the plurality of seed points for the plurality of grid cells.

16. The computer program product of claim 15, wherein the stable weighted center of mass for a cell is constrained to move perpendicularly to a principal heading direction of the cell.

17. The computer program product of claim 15, wherein the program code instructions to generate the one or more parking lot road links based on the identification of the compatible seed points comprise program code instructions to:

identify principal components of the shifted stable weighted centers of mass for the plurality of grid cells;

establish an orientation of the principal components of the shifted stable weighted centers of mass for the plurality of grid cells; and identify the one or more parking lot road links based, at least in part, on the orientation of the principal components of the shifted stable weighted centers of mass for the plurality of grid cells.

18. The computer program product of claim 17, wherein the program code instructions to identify the one or more parking lot road links based on the identification of the compatible seed points further comprise program code instructions to:

establish a heading density of the probe data within a predefined radius around the shifted stable weighted centers of mass for the plurality of grid cells; and identify the one or more parking lot road links based, at least in part, on the orientation of the principal components of the shifted stable weighted centers of mass for the plurality of grid cells and on the heading density of the shifted stable weighted centers of mass for the plurality of grid cells.

19. The computer program product of claim 11, further comprising program code instructions to:

identify one or more parking lot accessors based on map data;

generate one or more artificial seed point for the one or more parking lot accessors; and wherein the program code instructions to generate the one or more parking lot road links based on the identification of the compatible seed points comprise program code instructions to generate the one or more parking lot road links based on the identification of compatible seed points and the one or more artificial seed points.

20. The computer program product of claim 11, wherein the program code instructions to provide for guidance of the vehicle through the parking lot based on the generated parking lot map comprise program code instructions to:

provide autonomous vehicle control of the vehicle through the parking lot based on the generated parking lot map.

21. A method comprising:

receiving probe data from a plurality of probes in and around a parking lot;

identifying a plurality of seed points, wherein the plurality of seed points are iteratively created from the probe data;

generating one or more parking lot road links based on identification of compatible seed points that possess compatible seed point headings within a predefined heading angle of a new candidate vertex point;

determining a principal curve end of the one or more parking lot road links based on no additional compatible seed points remaining;

performing a spatial search from the principal curve end to determine if one or more candidate parking lot road links is within a predefined distance of the principal curve end of each of the one or more parking lot road links;

forming a T-junction between the principal curve end of the one or more a first parking lot road links and an identified parking lot road link of the one or more candidate parking lot road links in response to the identified parking lot road link being within the predefined distance of the principal curve end;

generating a parking lot map comprising the one or more parking lot road links; and providing for guidance of a vehicle through the parking lot based on the generated parking lot map.

22. The method of claim 21, wherein the compatible seed points comprise a respective seed point heading matching, within a predefined heading angle threshold, a heading of a principal component of the new candidate vertex point for a principal curve of a respective parking lot road link and the respective seed point heading matching, within the predefined heading angle threshold, a heading angle of a displacement vector of the new candidate vertex point.

23. The method of claim 21, wherein generating the one or more parking lot road links based on the identification of the compatible seed points comprises:

generating one or more principal curves using principal curve formation to identify the compatible seed points, wherein the generated one or more principal curves are identified as the parking lot road links.

* * * * *

UNITED STATES PATENT AND TRADEMARK OFFICE
CERTIFICATE OF CORRECTION

| | |
|---|---|
| PATENT NO. | : 11,409,292 B2 |
| APPLICATION NO. | : 16/827975 |
| DATED | : August 9, 2022 |
| INVENTOR(S) | : Ole Henry Dorum |

It is certified that error appears in the above-identified patent and that said Letters Patent is hereby corrected as shown below:

In the Claims

In Column 22, Line 55, Claim 21, delete "a first parking" and insert -- parking --, therefor.

Signed and Sealed this
Twenty-ninth Day of August, 2023

*Katherine Kelly Vidal*

Katherine Kelly Vidal
*Director of the United States Patent and Trademark Office*